US012388380B2

(12) United States Patent
Mickowski

(10) Patent No.: US 12,388,380 B2
(45) Date of Patent: Aug. 12, 2025

(54) PHASE-LOCKED LOOP CONTROL SYSTEM AND METHOD FOR A MOTOR

(71) Applicant: John R. Mickowski, Warwick, NY (US)

(72) Inventor: John R. Mickowski, Warwick, NY (US)

(*) Notice: Subject to any disclaimer, the term of this patent is extended or adjusted under 35 U.S.C. 154(b) by 155 days.

(21) Appl. No.: 18/203,747

(22) Filed: May 31, 2023

(65) Prior Publication Data
US 2024/0405700 A1 Dec. 5, 2024

(51) Int. Cl.
H02P 1/24 (2006.01)
H02P 6/18 (2016.01)
H02P 27/08 (2006.01)

(52) U.S. Cl.
CPC ............. *H02P 6/183* (2013.01); *H02P 27/08* (2013.01); *H02P 2203/03* (2013.01); *H02P 2203/11* (2013.01)

(58) Field of Classification Search
CPC ...... H02P 6/183; H02P 27/08; H02P 2203/03; H02P 2203/11; G05B 11/011; G05B 2219/34013
See application file for complete search history.

(56) References Cited

U.S. PATENT DOCUMENTS

2019/0109550 A1* 4/2019 Fukutani .................. H02P 8/12
2019/0131895 A1* 5/2019 Rivera .................... H02P 6/153

FOREIGN PATENT DOCUMENTS

CN 108803490 A * 11/2018 ........... G05B 19/402
WO WO-2020161496 A1 * 8/2020 ............. H02K 11/21

* cited by examiner

Primary Examiner — Karen Masih
(74) Attorney, Agent, or Firm — Howson & Howson LLP

(57) ABSTRACT

A system is provided for controlling rotation of a rotor relative to a stator of a stepping motor, linear motor, or the like. A driver pulse generating electronic device outputs driver pulses to a driver of the motor for causing discrete steps of rotation or linear movement of the rotor relative to the stator to control rotation or linear movement, direction of rotation or linear movement, and speed of rotation or linear movement of the rotor relative to the stator. The driver pulse generating electronic device is configured such that a signal proportional to a difference between a command input signal provided by a controller and an encoder signal of actual rotor position of the motor is used to determine when a next driver pulse is output from the driver pulse generating electronic device. A method is also disclosed.

18 Claims, 3 Drawing Sheets

PHASE-LOCKED LOOP CONTROL SYSTEM AND METHOD FOR A MOTOR

BACKGROUND

The present invention relates to a method and system for controlling operation of a stepping motor, a linear motor, or the like, and more particularly, the present invention relates to a phase-controlled method and system.

By way of example, stepping motors are known to provide several advantages over other types of motors intended to have tight control over rotational velocity and shaft position. A typical stepping motor has a permanent magnet rotor and stator poles arranged so as to create n stable positions (or small discrete "steps") in one shaft rotation of 360 degrees. Each step therefore occupies 360/n degrees of shaft rotation. By way of example, each discrete step of a two-phase motor with two bipolar stator windings with 200 steps will occupy 1.8 degrees (i.e., 360/200) of rotation of the shaft.

Stepping motors are commanded by a pulse train from a controller. By passing alternating and sequential current through the two stator windings, the stable position of the rotor will advance from one step position or step to the next, causing the rotor to rotate either clockwise (CW) or counterclockwise (CCW), depending on the sequence of the current in the windings.

A problem experienced with the conventional stepping motors is that the rotor may overshoot the next step. In the case where the rotor shaft load friction is light, the rotor will exhibit a damped oscillation about the stable position of the next step. As a function of the motor's physical construction, rotor and load inertia and friction, there will be a resonance phenomenon at certain RPM's. This has the effect of significantly reducing the motor's ability to apply torque to the load near the resonant RPM's. There may be more than one such resonating RPM. To compensate for this, the designer either has to select a motor with higher torque ratings or avoid operation at the resonance zones.

Avoiding resonance can be done by restricting RPM to speeds much lower than the motor is capable of, which requires much larger motors being operated inefficiently, or by using complex means of increasing the number of intermediate steps in order to accelerate through the resonance zone to reach the higher RPM's where motors are more efficient. These complex means, such as half-step or micro-steps, help accelerate through and/or reduce the resonance oscillations, but also reduce the available torque.

Conventional controllers for stepping motors control the frequency of the step by ramping up the pulse rate sequencing the winding phases in such a way as to accelerate through the resonance zone to the higher operating RPM. The rate at which the pulse rate is increased has to be carefully limited to pass through the resonance zone. If it is accelerated too fast, the motor rotor may completely lose synchronization with the pulses and stop or may skip steps. Thus, in that event the major advantages of stepping motors as compared to other types are lost.

SUMMARY

According to an aspect of the present invention, a control system for a stepping or linear motor having a rotor and stator is provided. The control system includes a driver pulse generating electronic device for outputting driver pulses to a driver of the motor for causing discrete steps of the rotor relative to the stator to control rotation or linear movement, direction of rotation or linear movement, and speed of rotation of linear movement of the rotor relative to the stator. The driver pulse generating electronic device is configured such that a signal proportional to a difference between a command input signal provided by a controller and an encoder signal of actual rotor position of the motor is used to determine when a next driver pulse is output from the driver pulse generating electronic device. Accordingly, the generation of driver pulses can be controlled by the phase angle or position of the rotor relative to the stator of the motor and not solely by the command input signal of the controller.

According to another aspect of the present invention, a method for controlling rotation or linear movement of a rotor relative to a stator of a stepping or linear motor is provided. The method includes generating driver pulses with a driver pulse generating electronic device and outputting the driver pulses to a driver of the motor for causing discrete steps of rotation or linear movement of the rotor relative to the stator to control rotation or linear movement, direction of rotation or linear movement, and speed of rotation of linear movement of the rotor relative to the stator. A signal proportional to a difference between a command input signal provided by a controller and an encoder signal of actual rotor position of the motor is received and used by the driver pulse generating device to determine when a next driver pulse is to be output whereby generation of driver pulses may be controlled by the phase angle or position of the rotor relative to the stator of the motor. The method may include determining a number of encoder pulses received from the encoder by the driver pulse generating device after which a next driver pulse is to be generated to optimize operation of the motor.

BRIEF DESCRIPTION OF THE DRAWINGS

The foregoing and other objects, features and advantages of the embodiments disclosed herein should become apparent from the following description when taken in conjunction with the accompanying drawings.

DETAILED DESCRIPTION

Figure 1:
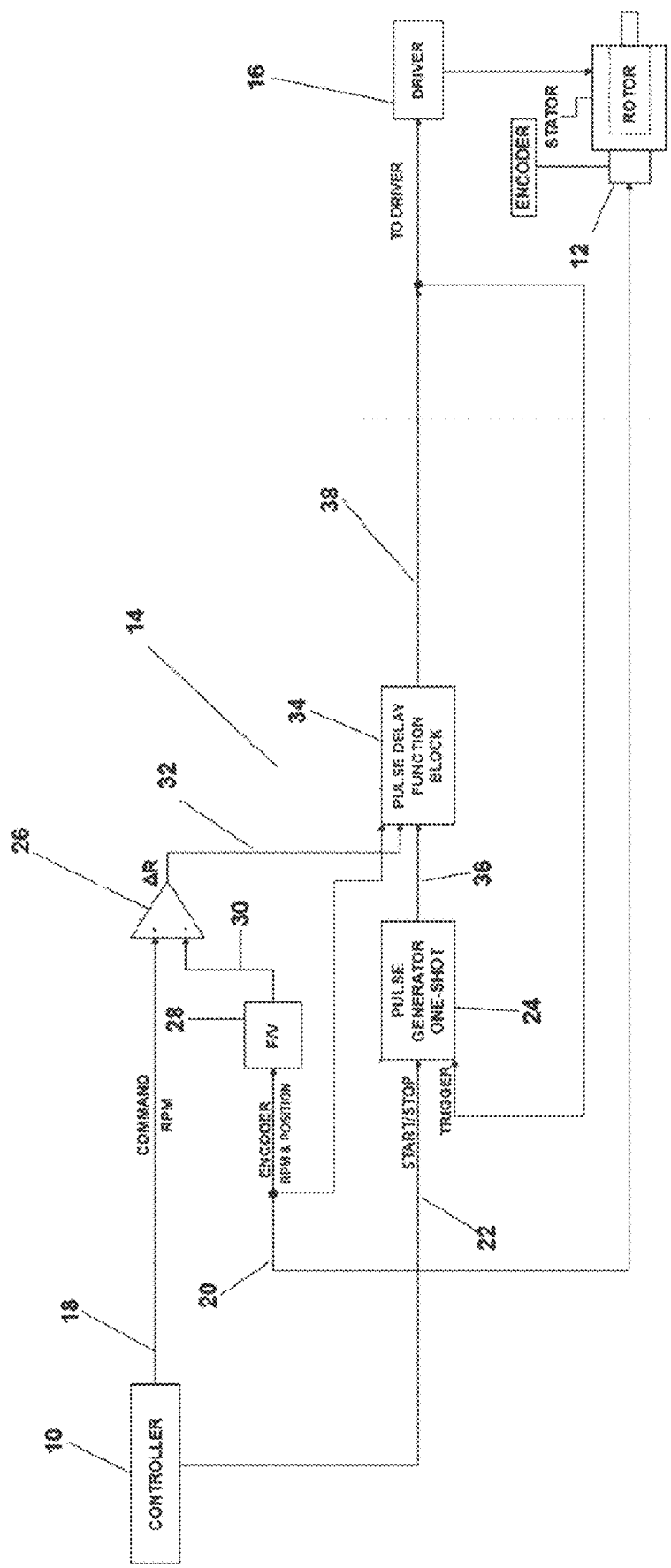
FIG. 1 is a flow diagram of a motor control system according to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known devices, apparatus, methods and structures have not been described in detail so as not to unnecessarily obscure the embodiments.

According to embodiments of control systems for use with a stepping motor, a method for controlling the sequence of phases generating the steps for a stepping motor is utilized. By way of example, instead of controlling the time between pulses to limit acceleration and decelerating through resonance zones and preventing the operation in resonance zones to avoid the motor losing synchronization, losing steps, or stopping outright, embodiments disclosed herein control the number of degrees, or fraction thereof, of rotor motion to delay before producing the next step. This ensures that the next pulse timing will be optimized to reduce resonance overshoots and oscillations, while maximizing the torque available to drive the rotor shaft load.

In particular, it is possible and often desirable to program an instantaneous increase or decrease in RPM to reduce the complete programmed motion's cycle time. If conventional control systems attempt this, the stepping motor will typically stutter or even stop. However, for embodiments disclosed herein, in the case of a programmed instantaneous acceleration, the pulse for the next step will be delayed until the position encoder shows that the rotor has advanced to the exact position for the acceleration torque generated by the electromagnetic fields of the motor's stator windings to be maximized. Not only does this cause the motor to accelerate as fast as the load permits, but it also eliminates the contribution to oscillation of stator fields mistimed by conventional pulse control means. At the same time, synchronization of pulses to rotor position is never lost and there are no missed steps.

According to an alternate embodiment, the motor is a linear motor with a so-called unrolled linear rotor and stator. The same method discussed above may be applied to the linear motor considering the linear position of the unrolled linear rotor relative to the unrolled linear stator.

Method of Controlling a Motor

By way of example and not by way of limitation, consider a two-phase bipolar stepping motor of 200 steps per revolution equipped with an encoder generating 3,600 pulses per revolution. When the rotor is at a stationary equilibrium null torque position with stator winding fields energized, the relationship between the torque and angular displacement away from the null torque position attempting to restore the rotor back to the null torque position approximates a sinusoid for two phase bipolar stepping motors. Therefore, in order to accelerate in a clockwise (CW) direction, the first pulse to the Driver will reverse the polarity of one of the two windings, thereby moving the equilibrium position by one step (1.8 degrees for a 200 step per revolution motor) CW. If the motor is equipped with a rotary encoder generating 3,600 pulses per revolution, each step will generate 3600 divided by 200, or 18 encoder pulses.

Figure 3:
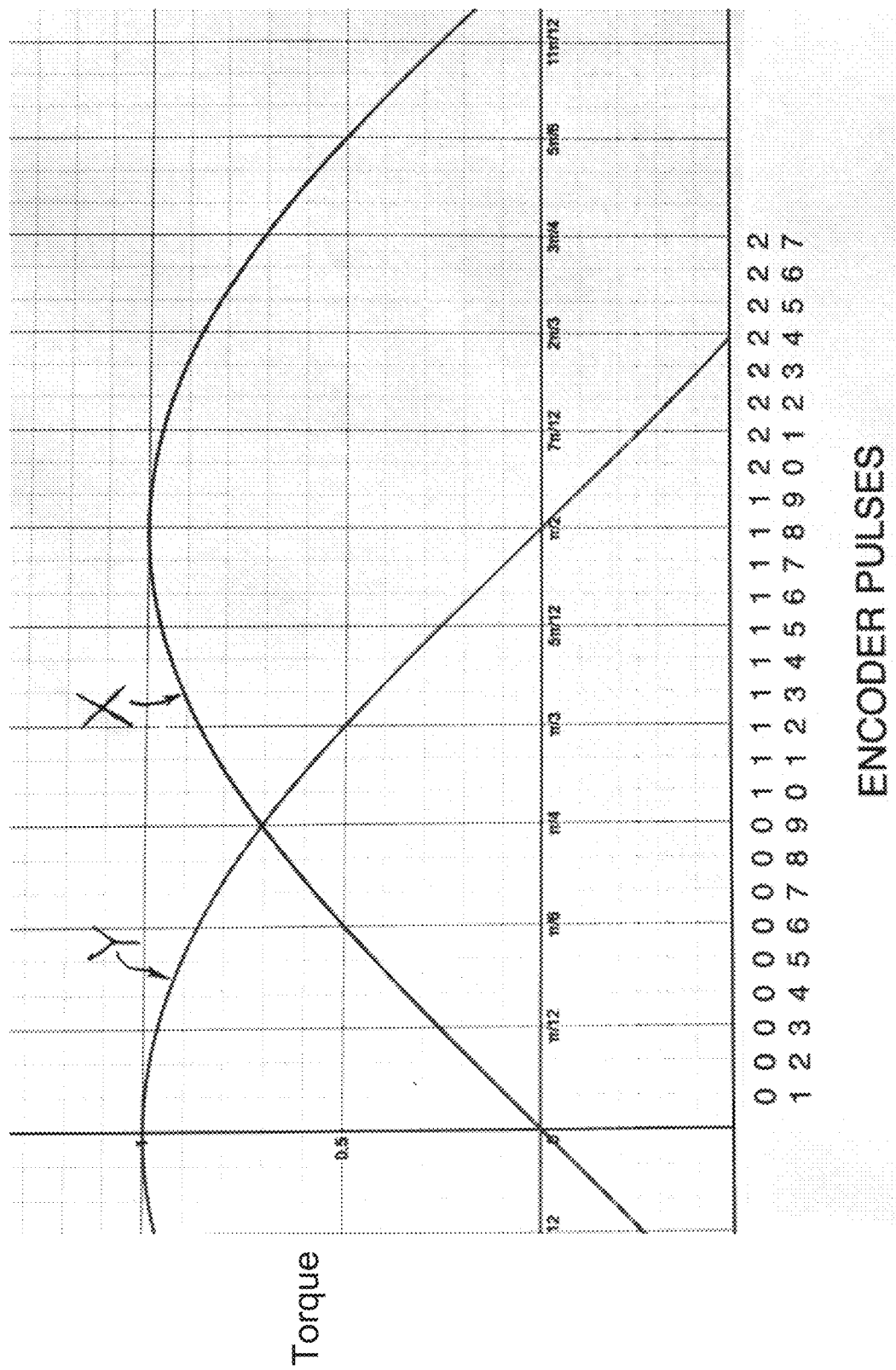
FIG. 3 is a graph showing the sinusoidal accelerating torque produced by a two-phase bipolar motor according to an embodiment relative to steps of rotation and encoder pulses.

FIG. 3 shows the relationship of torque versus rotor position for two successive steps. Line Y shows the torque versus rotor position at the instant the first step pulse is sent to the driver. Once the rotor moves nine encoder pulses CW, the sinusoidal CW accelerating torque will have declined from its initial peak to approximately 70.7% of the peak torque. For instance, see line Y in FIG. 3 after nine encoder pulses. At that point, line Y continues to decrease (see FIG. 3). However, if another pulse is sent simultaneously to the driver (driver pulse), the CW torque will also be approximately 0.7071 of the peak (i.e., see line X in FIG. 3 after nine pulses), but line X is increasing towards its peak as the rotor turns until it goes past the peak and starts to decrease as the rotor continues to rotate until it decreases to 70.7% of the peak at encoder pulse twenty-seven (see FIG. 3), at which time another command pulse is sent to the driver to sequence the stator winding currents CW. Each command pulse thereafter is generated when the rotor advances enough to generate eighteen additional encoder pulses. In this way, maximum acceleration is achieved by generating the maximum average torque.

In effect, the generation of driver pulses is not directly controlled by the Command RPM input signal. Instead, it is controlled by the phase angle of the rotor relative to the stator field. In this manner, the rotor accelerates very rapidly as the result of maintaining maximum average torque, while maintaining synchronization between rotor position and Driver pulse count. It will also minimize the time spent in resonance zones by simply accelerating through them.

While in the resonance zones, having the driver pulses synchronized with the position phase of the rotor, eliminates the tendency for driver phase shifts of conventional systems to contribute to incipient overshoot and oscillation tendency.

When the actual rpm (encoder RPM) reaches the command rpm, the number of encoder pulses to the next driver step is increased to twenty-seven, corresponding to the next equilibrium null torque step, and 18 additional encoder pulses thereafter such that no further acceleration occurs.

In order to decelerate, the encoder pulses to delay for the next driver pulse is increased over 18, so the torque is in the reverse direction, automatically slowing the rotor down. The rate of deceleration increases as the number of additional encoder pulses exceeding 18 is increased up to 27. As before, synchronization between driver pulses and rotor position is maintained.

A typical command rpm program might consist of a step function acceleration from zero RPM to an rpm R above resonance zones for a rotation of S steps, followed by a step function deceleration to a slow ("Jog") rpm J and continued at that Jog rpm until the total number of steps equals a desired number of steps. One need not be concerned about resonance or missed steps with such a program that minimizes cycle time.

However, it may be desirable to accelerate and/or decelerate at lower rates. Those rates are governed by the number of encoder steps to the next driver pulse ("Pulse Delay"). For example, a rotor will accelerate more slowly if the delay to the next encoder pulse is more than 18 counts, with 27 counts corresponding to zero acceleration. Conversely, the rate of deceleration will be reduced if the number of encoder pulse count exceeding 18 is less than 27. Accordingly, any desired rate of acceleration and deceleration and any desired program of the command rpm cycle can be achieved which the motor is capable of, while maintaining synchronization throughout. For example, while programmed to run at a relatively high constant rpm, if the torque exceeds the motor's capability, the rotor simply slows down to the point where the load torque and rotor torque are balanced, while continuously maintaining synchronization and rotor position and rpm control. In effect, the control system achieves a phase-locked loop, whereby the relative phase of the stator fields to the rotor position is used to control acceleration, deceleration, and RPM while maintaining synchronism.

As stated above, the method disclosed above may also be applied to a linear motor having an unrolled linear stator and linear rotor in a similar manner in which the linear motor has n steps per inch instead of n steps per rotation as discussed for the stepping motor.

Control System

According to an embodiment, a Phase Controlled Stepping Motor Control System is provided as an electronic device that accepts input signals corresponding to the desired RPM of the stepping motor at any given point of time from a controller, such as a PLC, computer, etc. At the same time, an encoder attached to the motor's rotor shaft provides a signal corresponding to the angular position of the rotor.

FIG. 1 provides a flow diagram of an embodiment showing the interaction of a controller 10, an encoder 12, a control system 14, and a driver 16 for a stepping motor (not shown). The controller 10 is responsible for providing a Command RPM signal 18, which may be an analogue signal, while the encoder 12 provides an encoder RPM and Position signal 20. The encoder 12 may be a digital encoder. The controller 10 is also responsible for generating a bilevel High/Low signal 22 (corresponding to Start/Stop) that initiates the sequence of pulses generated by a Pulse Generator One Shot 24 discussed in greater detail below.

The Command RPM signal 18 is connected to the + input of an operational amplifier (OP-AMP) 26. The encoder signal 20 is connected to a frequency to voltage converter 28 to generate an analogue signal 30 proportional to the encoder's RPM, which is in turn connected to the −input of OP-AMP 26. The output 32 of the OP-AMP 26, delta R, is thereby proportional to the difference between the Command RPM and actual motor rotor RPM and is connected as an input to a Pulse Delay Function Block 34 discussed in greater detail below.

When the Start/Stop signal 22 goes High, the Pulse Generator One-Shot 24 sends a single initial pulse 36 to the Pulse Delay Function Block 34, which transfers the pulse (shown as pulse 38) without delay to the commercially available stepping motor Driver 16 to initiate rotor motion. The pulse 38 to the Driver 16 is also fed back to a trigger input of the Pulse Generator One-Shot 24 which generates another pulse signal 36 to the Pulse Delay Function Block 34. However, for this and subsequent pulses, the delta R signal 32 is used to determine how many encoder pulses to delay before sending a pulse 38 to the Driver 16 to accelerate, decelerate, or maintain rotor RPM as described above for the Method.

In order to optimize performance, the relationship between the delta R signal 32 and the degree of delay to next Driver pulse 38 has been described for an ideal sinusoidal relationship between rotor position and torque generated by the stator's electromagnetic field. One convenient way to incorporate this relationship is by way of a "look up table" stored in memory of the number of encoder pulses to wait for versus the delta R signal 32 before sending a pulse 38 to the driver 16. This look-up table would vary depending on the type of stepping motor (variable reluctance, hybrid, unifilar, etc.), how many steps per revolution, how many pulses per revolution generated by the encoder, etc., to consider the relationship between rotor angular position and stator electromagnetic field to optimize performance.

In alternative embodiments without diminishing the efficacy of the control system, digital encoders could be replaced by analogue signal generators, thereby eliminating the need for the F/V converter 22, or the Command RPM signal 12 and OP-AMP 20 could be digital functions of a microprocessor, for example. Moreover, the entire control system could be accomplished digitally by a sufficiently fast microprocessor.

Figure 2:
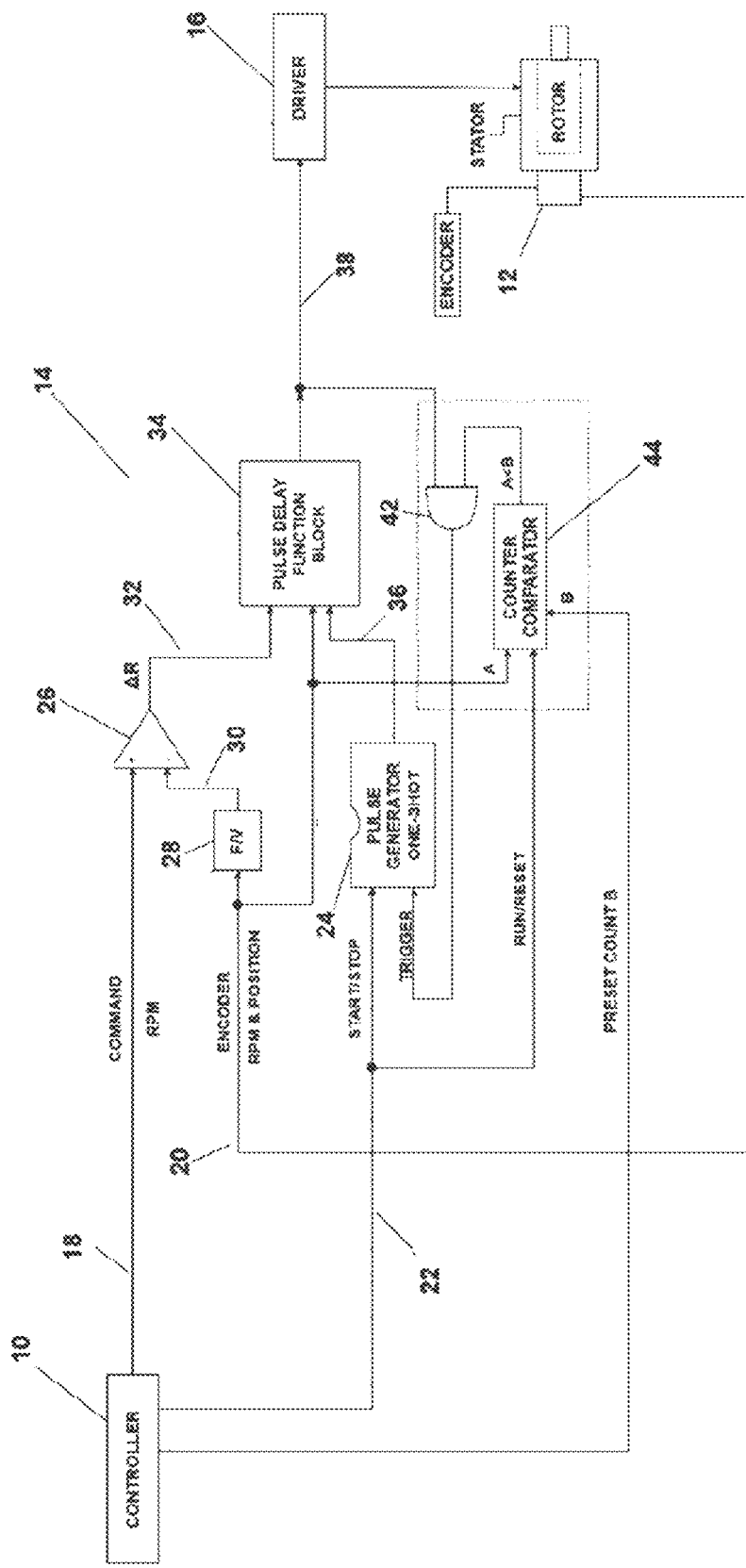
FIG. 2 is a flow diagram of a motor control system including rotational position control according to an alternate embodiment.

An alternative embodiment of a control system which also includes rotational position control is shown in FIG. 2. Many of the same devices and functions disclosed in FIG. 1 are also present in FIG. 2 (i.e., controller 10, encoder 12, driver 16, Command RPM signal 18, Encoder RPM and Position signal 20, Start/Stop signal 22, Pulse Generator One-Shot 24, Op-Amp 26, F/V converter 28, signal 30 from the converter, delta R signal 32 from the op-amp, Pulse Delay Function Block 34, signal 36 from the Pulse Generator One-Shot, and signal 38 from the Pulse Delay Function Block). However, the control system 40 in FIG. 2 also includes logical AND function 42 and a Counter Comparator 44 shown within dotted lines in FIG. 2. The number of pulses 38 sent to the Driver 16 (which are synchronized with encoder pulses 20 representing actual rotor position (A)) are compared to a preset count or number (B). When the actual rotor step count (A) equals the preset count B, Driver pulses stop triggering additional pulses and the rotor stops. By this means precise control of the total steps for a motion cycle are controlled in addition to the programmed RPM.

A similar arrangement may be provided for a linear motor having an unrolled linear stator and linear rotor having n steps per linear inch.

The foregoing description and specific embodiments are merely illustrative of the principles thereof, and various modifications and additions may be made to the apparatus by those skilled in the art, without departing from the spirit and scope of this invention.

The invention claimed is:

1. A control system for a motor having a rotor and stator, comprising
  a driver pulse generating electronic device for outputting driver pulses to a driver of the motor, the motor being a stepping motor and the driver pulses causing discrete steps of rotation or linear movement of the rotor relative to the stator to control rotation or linear movement, direction of rotation or linear movement, and speed of rotation or linear movement of the rotor relative to the stator,
  the driver pulse generating electronic device being configured such that a signal proportional to a difference between a command input signal provided by a controller and an encoder signal of actual rotor position of the motor provided by an encoder is used to determine when a next driver pulse is output from the driver pulse generating electronic device and such that generation of driver pulses is controlled by a phase angle of the rotor relative to the stator of the motor and not solely by the command input signal of the controller,
  wherein the driver pulse generating electronic device is configured to determine a number of encoder pulses received from the encoder after which a next driver pulse is to be generated.

2. The control system according to claim 1, wherein the command input signal is a command revolutions per minute (RPM) input signal corresponding to desired RPM of the rotor of the stepping motor relative to the stator during a motion cycle.

3. The control system according to claim 1, wherein the command input signal is an analogue signal.

4. The control system according to claim 1, wherein the encoder signal corresponds to the actual angular position of the rotor relative to the stator.

5. The control system according to claim 1, wherein the encoder signal corresponds to the actual RPM of the rotor relative to the stator.

6. The control system according to claim 1, wherein the encoder signal is a digital signal.

7. The control system according to claim 6, further comprising a frequency to voltage converter that converts the encoder signal to an analogue signal proportional to the actual RPM of the rotor relative to the stator.

8. The control system according to claim 1, further comprising on Operational Amplifier (Op-Amp) that receives the command input signal and the encoder signal and outputs the signal proportional to a difference between the command input signal and the encoder signal.

9. The control system according to claim 8, wherein the command input signal is connected to the + input of the Op-Amp and the encoder signal is connected to the − input of the Op-Amp.

10. The control system according to claim 8, wherein the driver pulse generating electronic device receives the encoder signal in the form of pulses from the encoder and the signal proportional to a difference between the command input signal and the encoder signal from the Op-Amp and is configured to determine therefrom the number of encoder pulses after which a next driver pulse is to be generated such that a next driver pulse is generated when a relationship between the angular position of the rotor relative to stator electromagnetic field of the stepping motor produces a pre-determined amount of torque.

11. The control system according to claim 1, further comprising a pulse generator one-shot component that is configured to receive a start/stop signal from the controller and the driver pulses from the driver pulse generating electronic device and to generate and output a pulse signal to the driver pulse generating electronic device which thereafter delays output of a next driver pulse by the number of encoder pulses.

12. The control system according to claim 1, further comprising logic and a counter comparator that control a total number of steps of the motion cycle of the stepping motor.

13. The control system according to claim 12, further comprising a pulse generator one-shot component, wherein the counter comparator receives a pre-set count of steps and the encoder pulses, the logic receives the driver pulses and an output signal from the counter comparator, and the pulse generator one-shot component receives a start/stop signal from the controller and a trigger from the logic to generate and output a pulse signal to the driver pulse generating electronic device after which output of a next driver pulse is delayed by the number of encoder pulses.

14. A method for controlling rotation or linear movement of a rotor of a motor relative a stator of the motor, comprising the steps of:
generating driver pulses with a driver pulse generating electronic device and outputting the driver pulses to a driver of the motor, the motor being a stepping motor and the driver pulses causing discrete steps of rotation or linear movement of the rotor relative to the stator to control rotation or linear movement, direction of rotation or linear movement, and speed of rotation or linear movement of the rotor relative to the stator, and
determining when a next driver pulse is to be output by the driver pulse generating electronic device based upon a signal proportional to a difference between a command input signal provided by a controller and an encoder signal of actual rotor position of the motor provided by an encoder such that generation of driver pulses is controlled by a phase angle of the rotor relative to the stator of the motor and not solely by the command input signal of the controller.

15. The method according to claim 14, wherein, during said determining step, a number of encoder pulses received from the encoder by the driver pulse generating device after which the next driver pulse is to be generated is determined by the driver pulse generating device.

16. The method according to claim 15, wherein the driver pulse generating electronic device receives the encoder signal in the form of pulses from the encoder and the signal proportional to a difference between the command input signal and the encoder signal and determines therefrom the number of encoder pulses after which a next driver pulse is to be generated such that a next driver pulse is generated when a relationship between the angular position of the rotor relative to stator electromagnetic field of the stepping motor produces a predetermined amount of torque.

17. The method according to claim 14, further comprising the step of controlling a total number of steps of a motion cycle of the stepping motor.

18. A method for controlling rotation or linear movement of a rotor of a stepping motor relative to a stator of the stepping motor, comprising the steps of:
generating a signal proportional to a difference between a controller RPM command signal and actual rotor RPM as an input to a function block, which delays transferring a stepping pulse to a driver of the stator of the stepping motor;
wherein the delay is calculated by the function block to equal a number of encoder pulses to a next stepping pulse in order to cause an electromagnetic field of the stator to optimize motor torque to accelerate, decelerate, or stop the rotor in accordance with the controller RPM command and start/stop signals; and
wherein each stepping pulse to the driver is fed back to trigger the next stepping pulse via a pulse generator one-shot to create a phase locked closed loop pulse generating system controlling stator phase using feedback from rotor phase.

* * * * *